United States Patent [19]
Koide et al.

[11] Patent Number: 5,932,271
[45] Date of Patent: Aug. 3, 1999

[54] FABRICATED RICE

[75] Inventors: Kaoru Koide, Tokyo; Takashi Fukushima, Higashiyamato; Takao Tomita, Kawagoe; Tamotsu Kuwata, Tokorozawa, all of Japan

[73] Assignee: Meiji Milk Products, Co., Ltd., Japan

[21] Appl. No.: 08/470,410

[22] Filed: Jun. 6, 1995

Related U.S. Application Data

[63] Continuation of application No. 08/136,401, Oct. 15, 1993, abandoned, which is a continuation of application No. 07/809,095, Dec. 10, 1991, abandoned, which is a continuation of application No. 07/528,647, May 24, 1990, abandoned.

[51] Int. Cl.⁶ .................. A23L 1/05; A23J 1/02; A21D 10/00; A23C 17/00
[52] U.S. Cl. .......... 426/573; 426/578; 426/657; 426/549; 426/583; 426/516; 426/661
[58] Field of Search .................. 426/573, 104, 426/803, 657, 583, 578, 516, 656, 276, 285, 549, 661, 389, 451, 452, 453, 456, 458, 463, 464, 473, 508, 517, 518, 808

[56] References Cited

U.S. PATENT DOCUMENTS

| | | |
|---|---|---|
| 3,620,762 | 11/1971 | Yoshida et al. |
| 3,778,514 | 12/1973 | Olson . |
| 4,125,630 | 11/1978 | Orthoefer ................ 426/104 |
| 4,430,356 | 2/1984 | Ohyabu et al. .......... 426/574 |
| 4,436,759 | 3/1984 | Trilling et al. .......... 426/573 |
| 4,440,794 | 4/1984 | Davies ................ 426/578 |
| 4,544,563 | 10/1985 | Lechthaler ............. 426/276 |

FOREIGN PATENT DOCUMENTS

| | | |
|---|---|---|
| 1668 | 1/1976 | Japan . |
| 5148 | 1/1983 | Japan . |
| 37068 | 2/1986 | Japan . |

OTHER PUBLICATIONS

Winton et al. The Structure and Composition of Foods. 1932. John Wiley & Sons, Inc., New York. pp. 36, 37, and 138.

Stauffer Chemicals. Whey Proteins and Modern Food Processing. Food Industry Release No. 8. 1977. pp. 1–25.

*Primary Examiner*—Anthony J. Weier
*Attorney, Agent, or Firm*—Pennie & Edmonds LLP

[57] ABSTRACT

Fabricated rice containing whey protein in the range of 0.1–10% by weight, and optionally sodium alginate and calcium, and a process for preparing the same by mixing starches, whey protein(s), and optionally sodium alginate and a calcium salt with water, followed by heating and shaping.

9 Claims, No Drawings

FABRICATED RICE

This is a continuation of U.S. patent application Ser. No. 08/136,401, filed Oct. 15, 1993 and now abandoned which is a continuation of U.S. patent application Ser. No. 07/809095 filed Dec. 10, 1991 and now abandoned which is a continuation of U.S. patent application Ser. No. 07/528647 filed May 24, 1990 and now abandoned.

BACKGROUND OF THE INVENTION

1. Field of the Invention

This invention relates to fabricated rice prepared from starch materials such as corn starch, wheat starch, rice starch, etc.; whey protein materials such as whey powder, whey protein concentrate, whey protein isolate, etc.; and optionally, other grain powders such as nonglutinous rice flour. More specifically, it relates to fabricated rice which contains nutritively advantageous whey protein, retains its shape still after the rice-cooking operation and are suitable for use in a dietary treatment.

2. Prior Art

Manufacture of fabricated rice had already been proposed pre-war. In Japan, however, such proposal was intended to treat national rice shortage, up to about 1950, by providing a substitution for natural rice from low price materials such as wheat flour, potatoes, corns and/or the like.

Since then, in due course of time, the economical demands for imitation rice had almost disappeared and efforts to develop fabricated rice had decreased considerably. Recently, however, studies on fabricated rice have revived for the purpose of nutritive enrichment and/or optimum control of human nutrition, or for dietary treatment.

In the following, several related prior art will be raised for reference.

a) For nutritive enrichment and optimum control of human nutrition, nonglutinous rice flour as a main constituent was mixed with starches, calcium phosphate, and vitamin A, and the mixture was extruded under high pressure and shaped. (Japanese Patent LOP Publn. No. Sho-58-5148). Alternatively, rice- or wheat germs were used as raw materials for the purpose of enriching vitamin $B_1$ content. (Japanese Patent LOP Publn. No. Sho-48-44453).

b) According to another method for fabricating fabricated rice, a mixture of pure starch and water is heated, pressurized and kneaded to provide fabricated rice especially adapted for those having renal failure. (Japanese Patent LOP Publn. No. Sho-50-24453).

c) For special uses, starch-rich grains such as rice, barley, wheat or the like are modified by adding vitamin(s) and calcium to adjust swelling degree of the product. (Japanese Patent LOP Publn. No. Sho-61-37068). Alternatively, a mixture of rice flour and white rice bran is steamed, kneaded, shaped, and then coated with a mixture of pregelatinized rice flour and koji, thus providing fabricated rice suitable for preparing rice koji. (Japanese Patent LOP Publn. No. Sho-51-1668).

SUMMARY OF THE INVENTION

There is a need for fabricated rice which meet the following two requirements.

(1) capable of being used in alimentotherapy for those having renal failure or hepatic disorder, the protein intake of whom is restricted to a narrow range.

(2) capable of being cooked analogously to natural rice using conventional electric rice cooker.

The protein content of new fabricated rice which meets the first requirement above should considerably low, for example, less than 3.5% by weight, in comparison with natural rice which contains about 7/% by weight protein when polished. At the same time, the protein contained must be of nutritiously very superior quality. Furthermore, the phosphorus content of the fabricated rice must be low.

It is impossible to prepare fabricated rice having the above mentioned desirable properties if grains or flour thereof are used as a primary constituent as referred to at a) and c) of the prior art. Therefore, as referred to at b), refined starch containing no grain-origin protein has been used to prepare fabricated rice for dietary treatment.

However, the products manufactured in such way tend to lose its shape during cooking. Even if it keeps the shape thereof during and upon cooking, the texture thereof is much worse in comparison with the natural rice cooked. For these reasons, the prior art fabricated rice is highly unsatisfactory for use as daily staple food for patients on dietary treatment. So-called "starch rice" fabricated from starch is manufactured by adding water to starch in an extruder or a similar processing machine to transform substantial part of the starch into pregelatinized state, followed by shaping and drying. In this case, the inside structure of the produced fabricated rice consists generally of a major amount of gelatinized starch and a minor amount of crystalline starch in a substantially homogenized state. On the other hand, natural rice contains raw-starch as well as insolubilized storage protein, thus being incapable of swelling through washing or digestion with water. Only a certain limited swelling occurs through conventional cooking. On the other hand, the starch rice absorbs water and swells very easily, and upon cooking it softens and tends to loose the grain shape and to stick each other. Thus, the fabricated starch rice alone cannot provide the desired shape of conventionally cooked rice.

Furthermore, if fabricated starch rice is mixed with natural rice and cooked together, the resultant cooked rice will be unsuitable to eat due to considerable difference in the water-absorbability between fabricated rice and natural rice. More specifically, under cooking conditions suitable for natural rice, the fabricated starch rice will become pasty. On the contrary, under cooking conditions suitable for the starch rice, natural rice still retains therein raw solid cores.

Furthermore, those patients having renal failure should take reasonable amount of protein (amino acids) to maintain and improve nutritive conditions, while simultaneously restricting the amount of protein to prevent the decrease in renal function and worsening of uremia. For this purpose, the patients should take only small amount of nutritively advantageous protein (amino acids). Foods suitable for such purpose should contain least but necessary amount of nutritively advantageous protein, and should be as possible as phosphorus-free.

To solve the above problem, the novel fabricated rice must contain whey protein which has high protein quality, in other words, high Fischer's ratio (branched-chain amino acid/tyrosine, phenylalanine), as a requisite for providing fabricated rice having limited quantity of protein. As for the effects of branched chain amino acid under low protein intake conditions, see The Japanese Journal of Parenteral and Enteral Nutrition Vol. 8 (1), 3–8 (1986); ibid. Vol. 3 (2), 101–108 (1981).

Starting materials suitable for the supply of whey protein include whey protein concentrate (WPC) which is prepared by the ultra-filtration of whey to reduce lactose content and minerals followed by drying, and whey protein isolate (WPI) which is prepared by removing lactose and minerals from whey by passing through ion-exchange resin, and drying. As a further feature of the present invention, the shape-retaining ability during cooking can considerably be improved by using whey protein. This is supposed that, by applying heat during the fabricated rice preparing process, thermal denaturation and aggregation of whey protein occur and a loose network of the aggregated protein is formed within the fabricated rice grains, thus preventing excess swelling upon absorption of water. Therefore, possible leakage of the nutrients can be avoided.

Whey protein content (N×6.38) of the final products may vary within 0.1–10%, preferably 0.5–7% by weight. If lower than these limits, the aforementioned nutritive effect and shape-retaining ability become insufficient, and when higher than the above specified level, the amount of protein would be too much for those suffering from renal disorder. In addition, in this case, the fabricated rice may exhibit a disadvantageous, dark yellowish appearance which is induced by coloration on heating during the preparing process.

For the purpose of reducing the phosphorus intake by those having renal disorder, it is necessary to use such protein as containing least amount of phosphorus. Both WPC and WPI satisfy the above requirement, as will be clearly seen from the following Table 1.

TABLE 1

Phosphorus Content of Natural Proteins

|  | Protein content g/100 g | Phosphorus content mg/100 g | mg P/g protein |
| --- | --- | --- | --- |
| WPC | 75 | 330 | 4.4 |
| WPI | 92 | 30 | 0.3 |
| Polished Rice | 6.8 | 140 | 20.6 |
| Wheat Flour (strong flour) | 11.7 | 75 | 6.4 |

Any starch can be employed for the production of new fabricated rice, if it contains as low protein and phosphorus as possible and has a high degree of whiteness. Suitable examples include corn starch, waxy corn starch, rice starch, wheat starch, potato starch and the like.

Use of less than 50%, preferably 25% or less of nonglutinous rice powder, based on the total dry weight of the dry feed materials may bring about considerable improvement in texture and shape-retaining property. It should be noted in this case, however, that the protein contained in nonglutinous rice may possibly be transferred to the product. It is necessary to keep the amount of the transferred protein in the product less than 1.5% by weight.

In order to further improve the shape-retaining property during cooking of the fabricated rice to provide the same texture as natural rice, an addition of 0.1–2.5% by weight of sodium alginate, based upon total weight of the dry feed materials mixed, and soluble calcium salt in an amount to impart 50–800 mg of calcium per 100 g of the product rice, is sufficient. This is because the alginate dissolved in water during the fabrication process will react with calcium ion to form insoluble calcium alginate which imparts a strong network within each grain of the fabricated rice. Any kind of food additive grade calcium salts may be used, for example, calcium chloride, calcium lactate, calcium gluconate, calcium carbonate and so on.

DETAILED DESCRIPTION OF THE INVENTION

As mentioned above, the present invention provides nutritively and organoleptically excellent fabricated rice suitable for alimentotherapeutic use for those having renal disease, hepatic disorder, etc., by employing whey protein, and additionally incorporating calcium alginate as formed in the product.

Furthermore, by use of an extruder, fabricated rice having excellent physical properties can be prepared easily.

The fabricated rice of the present invention may be prepared, for example, as follows:

Starches, WPC or WPI, and optionally grain flour such as nonglutinous rice powder, sodium alginate and a calcium salt are mixed together by means of a mixing machine such as ribbon blender or the like to give a homogeneous powder. Then, the mixture is introduced into a twin-screw or a single-screw extruder, and water is added via a separate inlet, and the whole is heated and kneaded. During this period, the starch is converted into pregelatinized state. When the whole materials become to a paste-like mixture, the latter is then extruded from an orifice of a die at the tip of the machine. Then, the extruded product is cut into pieces and dried to afford grain-like products. The heating temperature in the extruder is preferably in the range of 80°–120° C. At 80° C., the percentage of pregelatinization in the produced fabricated rice amounts to 50–60%, and at 120° C., 90% or more. The optimum extent of pregelatinization is in the range of 50–95%, depending upon the type of the extruder. Above this limit, the elasticity of the starch paste in the extruder will become higher and the machine will become impossible to operate. Below the above-mentioned limit, on the other hand, the resultant fabricated rice will be too fragile to be washed or cooked.

The following Examples further illustrate the present invention, wherein all parts are by weight unless otherwise stated.

EXAMPLE 1

Corn starch (50 parts), rice starch (40 parts), WPC (7 parts) and nonglutinous rice flour (3 parts) were mixed together, and the mixture was introduced into a twin-screw extruder and kneaded with the addition of water in the ratio of the mixture to water of 70:30, and heated (120° C.). Then, the mixture was extruded through a 2 mmφ circular die, and cut into pieces 3–4 mm in length which were air-dried to provide fabricated rice grains.

The protein content of the fabricated rice thus obtained was: rice protein 0.2% and whey protein 5.3%.

The fabricated rice thus obtained was mixed with water at the ratio of rice to water of 1:0.95 (by weight) and cooked with electric rice cooker to give cooked rice having strongly sticky nature, yet retaining the original shape well.

EXAMPLE 2

Corn starch (60 parts), waxy starch (24.7 parts), nonglutinous rice flour (10 parts), WPC (3 parts), sodium alginate (0.16 parts) and calcium chloride dihydrate (1.5 parts) were mixed together and the mixture was kneaded in a twin-screw extruder with water in a ratio of the mixture to water of 63:37 and heated at 100° C., and worked up in the same manner as in Example 1. The protein content of the resulted fabricated rice was: rice protein 0.7% and whey protein 2.3%.

The fabricated rice thus obtained was mixed with water in a ratio of the rice to water of 1:0.95 (by weight) and cooked in an electric rice cooker to give the cooked rice having the same texture as natural rice cooked.

A 50:50 mixture of the fabricated rice and natural rice was cooked to yield cooked rice having the same texture as natural rice.

EXAMPLE 3

Rice starch (50 parts), corn starch (43.7 parts), WPI (4.4 parts), sodium alginate (0.4 part) and calcium chloride dihydrate (1.5 parts) were mixed in a ribbon blender and the mixture was kneaded in a twin-screw extruder with water in a ratio of the mixture to water of 63:37 and heated at 100° C., and worked up in the similar manner as in Example 1. The protein content of the resulted fabricated rice was: rice protein less than 0.1% and whey protein 4%.

To a mixture of the fabricated rice thus obtained (200 g) and natural polished rice (200 g) was added water (400 g), and the resultant mixture was left to stand for about 30 minutes. Then, a certain quantity of freeze-dried vegetables and a spoonful of salt-reduced soy sauce were added, and the mixture was cooked in an electrical rice cooker and let steam to settle for about 30 minutes to produce cooked rice with other foods.

What is claimed is:

1. A fabricated rice, which retains a rice-like shape after conventional cooking, formed by heating, extrusion, cutting into rice-like shape and drying of a paste mixture of water and a powder comprising a starch selected from the group consisting of corn starch, waxy corn starch, wheat starch, potato starch, rice starch, and mixtures thereof, and whey protein, wherein the amount of the starch in the powder is between 84–94% by weight and the amount of whey protein in the fabricated rice is between 0.1–10% by weight.

2. A fabricated rice according to claim 1, wherein the powder further comprises non-glutinous rice flour.

3. A fabricated rice according to claim 1, wherein the powder further comprises sodium alginate and a calcium salt.

4. A fabricated rice according to claim 1, wherein the whey protein is selected from the group consisting of whey protein concentrate, whey protein isolate, and a mixture thereof.

5. A fabricated rice according to claim 3, wherein the calcium salt is selected from the group consisting of calcium chloride, calcium lactate, calcium gluconate, calcium carbonate, and mixtures thereof.

6. A fabricated rice according to claim 2, wherein the amount of non-glutinous rice flour is less than 50% by weight of the powder.

7. A fabricated rice according to claim 6, wherein the amount of non-glutinous rice flour is less than 25% by weight.

8. A fabricated rice according to claim 3, wherein the amount of sodium alginate in the powder is between 0.1 and 2.5% by weight and the amount of calcium per 100 grams of fabricated rice is between 50 and 800 milligrams.

9. A fabricated rice according to claim 1, wherein the amount of whey protein in the fabricated rice is between 0.5–7% by weight.

* * * * *